United States Patent [19]

Fesquet

[11] 4,112,674

[45] Sep. 12, 1978

[54] MACHINERY FOR THE MASS PRODUCTION OF PRONGED MEMBERS OR OF CONTINUOUS STRIPS OF PRONGED MEMBERS

[76] Inventor: Amedee Fesquet, 12380 Saint-Sernin-sur-Rance, France

[21] Appl. No.: 798,356

[22] Filed: May 19, 1977

[30] Foreign Application Priority Data

May 20, 1976 [FR] France ............................ 76 15598

[51] Int. Cl.² .................... B21Q 7/02; B21D 53/46
[52] U.S. Cl. .................................... 59/72; 72/335; 113/116 Y
[58] Field of Search ................... 72/404, 405, 335; 59/71, 72, 77; 113/116 Y

[56] References Cited

U.S. PATENT DOCUMENTS

| 959,020 | 5/1910 | Lewis | 59/72 |
|---|---|---|---|
| 2,431,812 | 12/1947 | Lang | 59/72 |
| 3,380,282 | 4/1968 | Scaletta | 72/335 |
| 3,866,471 | 2/1975 | Carroll | 113/116 Y |

Primary Examiner—C. W. Lanham
Assistant Examiner—Gene P. Crosby
Attorney, Agent, or Firm—Keil, Thompson & Shurtleff

[57] ABSTRACT

Machinery for the industrial mass production of rigid pronged members or of continuous strips of a series of pronged members linked together by linking bridges, and embodying two dies in facing assembly, the first die having a longitudinal groove composed of the following successive segments: an inlet section for guiding a strip of metal, a cutting section with an opening for scrap removal, a die stamping section, and finally an outlet section for guiding the formed pronged members, and the second die, facing the die stamping section, having means for forming the heads of the pronged members and for bending down the prongs, and also having a suitable cutting counter face opposite the cutting die.

5 Claims, 13 Drawing Figures

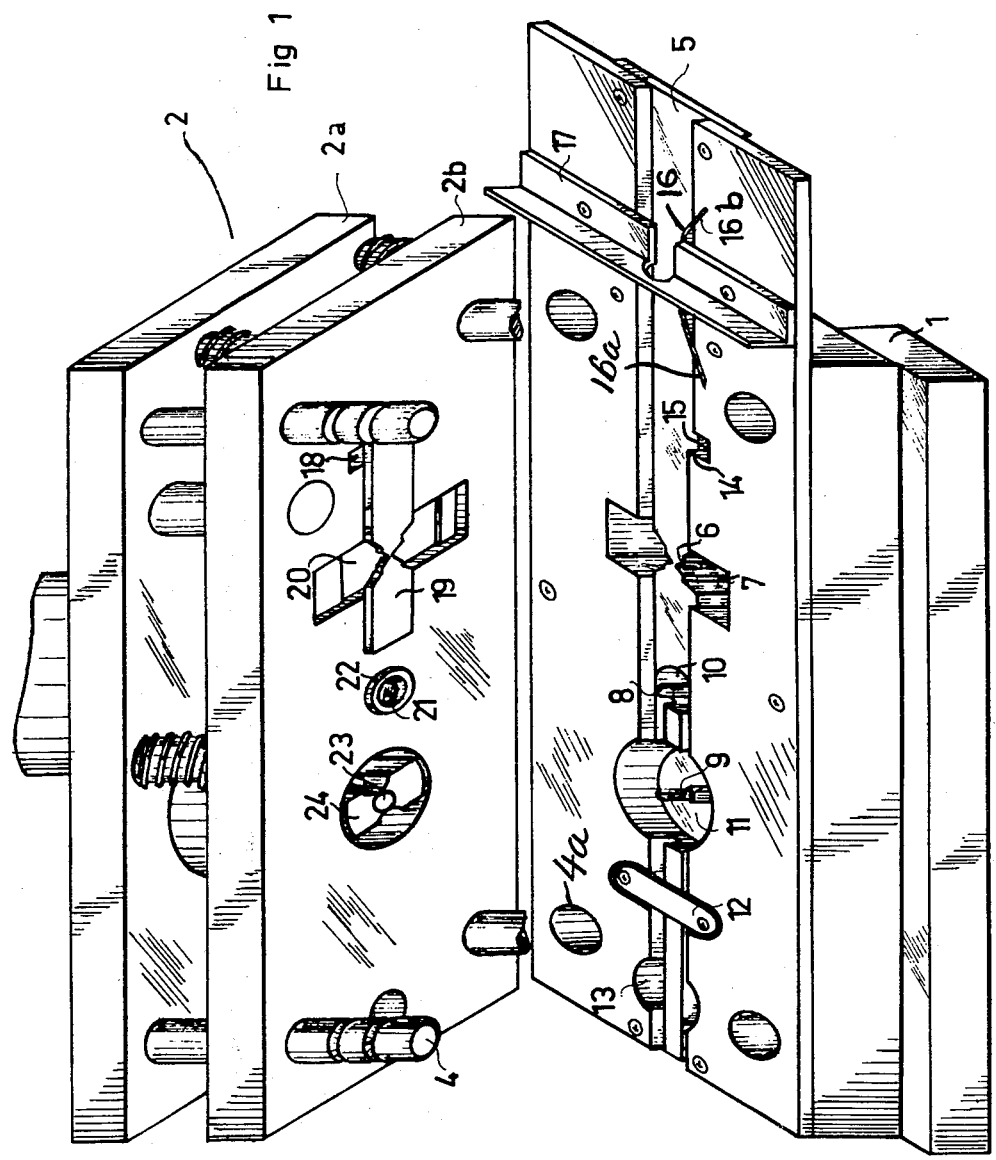

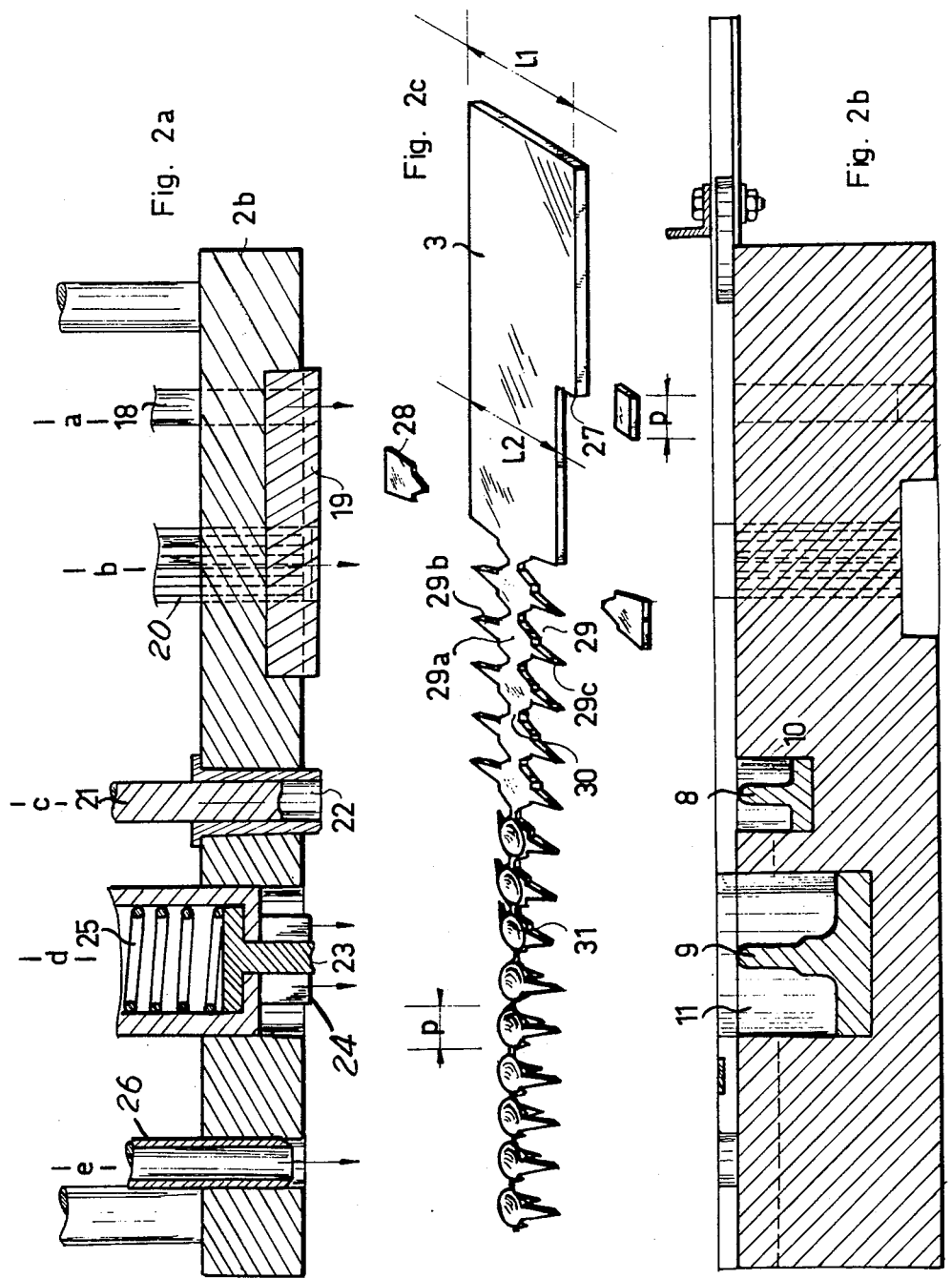

MACHINERY FOR THE MASS PRODUCTION OF PRONGED MEMBERS OR OF CONTINUOUS STRIPS OF PRONGED MEMBERS

The invention pertains to machinery for industrial mass production of rigid pronged members or of continuous strips of a series of pronged members linked together by linking bridges or necks.

Currently, there are two principal processes by which rigid, solid head, pronged members are industrially mass produced. Solid head pronged members, as used herein, means such members demonstrating good mechanical strength, sufficient enough to be driven into extremely hard elements and to assure strong bonds or joints.

One of these processes consists of producing pronged members by adding to a preformed solid head a point which is fixed to the center by welding, brazing, crimping, etc. This process, which results from manufacturing two separate parts, and then fixing one onto the other, is complex and costly, preventing a cost reduction of the spike members that are produced.

Another manufacturing process consists of producing pronged members from a rod and shaping the head at the end of the rod by die stamping. This process produces only pronged members with heads of reduced size. Furthermore, since die stamping of heads is done individually for each member, automation of this technique requires complex and costly machinery.

There is also a process by which tacks or other small pronged members of weak deformation resistance are produced. This process consists of using a thin metal disc used to constitute the head of the tack. Two sides of a triangle, used to form the prong, are cut through the disc, following by bending this triangle perpendicularly to the plane of the head. This process yields elements that are not very rigid, i.e., the pierced head is not very resistant and the point is very short because it is shaped from the head and is limited by the dimensions of the head.

Furthermore, every process mentioned above results in individual, pronged members which are separate from each other and are poorly suited for filling the supply chambers of automatic devices such as guns, etc., for driving and setting the pronged members. Manufacturers came up with the idea of packaging such members in continuous strips by bonding them with a strip, usually made of synthetic materials to facilitate their use in such automated devices. However, since this packaging occurs after manufacturing of the pronged members, it constitutes an additional operation adding to the cost price of the continuous strips.

The invention has for its primary objective the remedy of the disadvantages mentioned above.

One of the objectives of the invention is, in particular, to provide machinery capable of industrially mass producing rigid pronged members having solid heads and unlimitedly long prongs, under remarkably economical and profitable conditions.

A second objective is to mass produce directly continuous strips of pronged members that are linked to each other without a separate connecting element.

In order to achieve this, the invention involves machinery allowing for the production of rigid pronged members having one solid head and at least one pointed prong. The machinery uses two dies adapted to be assembled opposite each other on a stamping press in order that one consequently comes to exert pressure against the other. In the invention, one of the dies has a longitudinal groove successively consisting of, along its length, the following: an inlet section for guiding a strip of metal, a cutting section consisting of a suitable stamp cutting mold with an opening for scrap removal; a die stamping section consisting of at least one die stamping finger which is located in a cavity provided in the die and projects toward the longitidunal groove, and finally an outlet section where the bottom of the groove is provided with longitudinal slits for guiding the prongs of the stamped members. The other die, facing the above-mentioned cutting section, has a counter-mold with a movable cutting die corresponding to the shape of the cutting mold. It also has, opposite the die stamping section, at least one solid, movable punch with the work contact surface at the end thereof at a right angle to the die stamp finger for shaping the pronged member head and at least one hollow punch surrounding the first one for folding back the prongs.

Other characteristics, objectives and advantages of the invention will be found in the following description of a preferred embodiment which is illustrated in the drawings, which constitute an integral part of the description:

IN THE DRAWINGS

FIG. 1 is a perspective, exploded view of a preferred form of dies of the invention adapted for use on conventional industrial presses;

FIGS. 2a and 2b are longitudinal sections of the dies and FIG. 2c is a perspective view of a metal strip as it is cut and shaped during production into the ultimate series of pronged members;

Figure 4:
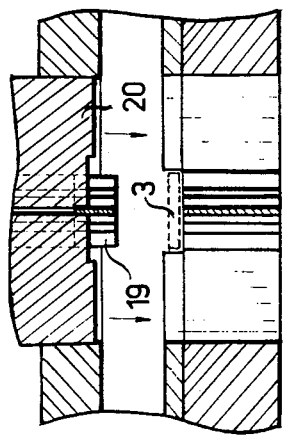
FIGS. 3, 4, 5, 6 and 7 are fragmentary cross-sections, taken along planes a, b, c, d, and e, respectively, at the various work stations of the dies.
Figure 3:
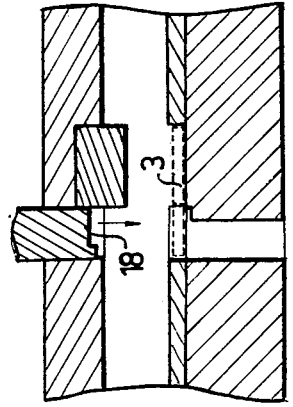
Figure 5:
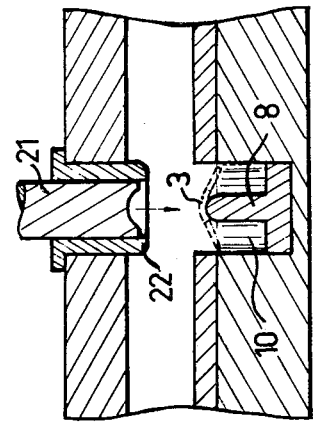
Figure 7:
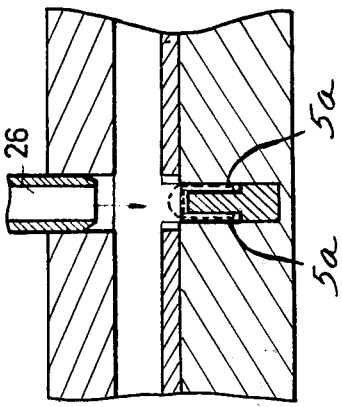
Figure 6:
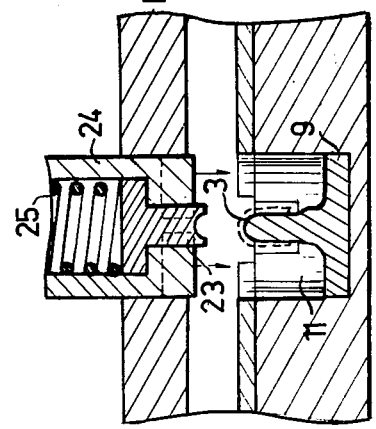

The machinery shown by way of example in FIGS. 1 to 7 is composed essentially of two industrial press tools 1 and 2 which perform the functions of cutting and shaping the metal strip 3, which can be seen in perspective in FIG. 2c and is shown in broken lines in the cross-sections of FIGS. 3 to 7.

Tool 1 is composed of a die adapted to be mounted on a fixed bed of a stamping press. Tool 2 is adapted to be mounted on the mobile bed or head of this press. Tool 2 is composed of a plate 2a attached to the press and of die 2b mounted on the plate 2a with guiding columns and the usual release springs which permit their coming together once the press is closed and die 2b lies against die 1. The closing and the opening movements between the opposed faces of the two tools 1 and 2 are guided in the classical way by the guide rods 4, which are seated slidably in openings 4a.

Die 1 has a longitudinal groove 5 consisting of the following: an inlet section where the metal strip 3 is admitted and guided; a cutting section consisting of two, opposed stamp cutting die molds 6 with an opening 7 for scrap removal, a die stamping, work shaping section which in the example consists of two successive stations, each one equipped with a die stamping finger 8 and 9, respectively, located in cavities 10 or 11 provided in the die and projecting toward the groove 5, and finally an outlet section where the width of the groove becomes smaller and where the bottom of the groove is slotted to provide with two longitudinal slits 5a for guiding the two prongs of the pronged members produced by the cutting, punching and shaping operations.

On the outlet section, a bridge 12 is provided which prevents the pronged member strip from rising in the groove as a reaction to die stamping. A notch 13 is also provided which is used to permit the passage of a cutting punch for partial cutting of the pronged member strip.

Furthermore, in the vicinity of its inlet section, the groove 5 has two parts of different widths, a downstream part of smaller width beginning with offset wall 14, which forms a stop, and the wider upstream part. Adjacent the offset wall 14, the die 1 has a shear-edge opening 15 coupled with a passage for scrap removal.

In addition, there is a springable strip 16 running along the groove 5 in the inlet section on the same side as the offset 14. This helps to press and guide the metal strip against the other side of the groove. In the example, the crossbeam 17 prevents this strip from coming loose from the two slits 16a and 16b cut into the edge of the groove, in which are mounted the ends of the above-mentioned strip 16.

Movable tool 2 has elements which are used in conjunction with those described above and are intended to work with them when the press is closed. FIGS. 3, 4, 5, 6 and 7 show cross-sections of the various work stations, and dotted lines have been drawn on these figures to represent the metal strip in the shape in which it appears when it arrives at the given work station before being processed.

At a right angle to the inlet section of the groove 5, the plate 2b has a cutting punch 18 (FIGS. 1, 2a and 3), capable of sliding into the opening 15 of die 2b when the presses are closed in order to make a lateral cut in the edge of the strip 3 at the line of the offset 14. In the example, this punch is rectangular. The cut it makes narrows the strip 3 to that of the narrower segment of the grooves. The length of the cut (longitudinally along strip 3) equals the pitch, the pitch length being equal to length p (FIG. 2c), the dimension of each pronged member in the longitudinal direction of the strip 3.

At a right angle to the cutting section (FIGS. 1, 2a and 4), tool 2 has counter-piece 19 fixed on its die 2b and a movable cutting punch 20 corresponding to cutting mold opening 6. In the example, this punch corresponds in shape to parts 28 to be removed between two successive pronged members (FIG. 2c). Movable punch 20 is fixed to plate 2a in order to fit matingly into counter-piece 19 when the press is closed and to carry out the cutting of the strip which is held between mold opening 6 and counter-piece 19.

At a right angle to the first station of the die stamping section (FIGS. 1, 2a and 5), the tool 2 has a solid movable punch 21 lodged in a hollow cylindrical punch 22. Solid punch 21 is fixed to plate 2a and the hollow punch is fixed to die 2b in such a way that when the press is closed, the latter partially bends back the prongs of the blank 29 (cut in the preceding section) and the solid punch and finger shape the central portion 29a of this blank to form the domed pronged member heads.

At a right angle to the second station in the die stamping section (FIGS. 1, 2a and 6), the tool 2 has a solid tip, retractable punch 23 axially movably seated in a movable hollow punch 24. The latter is axially movable in the plate 2b and fixed to plate 2a. Solid punch 23 is biased by spring 25 and finishes forming the head, notably in the vicinity of its edge, while punch 24 completes the bending of the prongs at a right angle to the head over the opposite sides of the finger 9.

Finally, at the outlet section, the tool 2 has a cutting punch 26 fixed to plate 2a in a preadjustable position. In the example, this element is cylindrical and is positioned so that its cutting edge has two parts positioned opposite to the linking bridges located on both sides of each head of each pronged member. The two parts of the cutting edge are set at a predetermined depth by the preadjusted position of punch 26 to either cut through the necks or form notches therein to facilitate later breaking of the necks along the notches.

FIG. 2c, which shows the shape of the metal strip 3 at the various work stations, aids in the understanding of the steps in the manufacturing process provided by the machinery described above.

A metal strip supply is provided by conventional type automatic feeding devices, either with rollers or with pressure grippers. When the strip 3 enters the groove 5, its width is less than that of the groove in the upstream part of the inlet section and more than the width L2 in its downstream part.

At each sequence, punch 18 cuts off the edge of the strip by the amount exceeding the final strip width L2 and by a length equal to pitch p. A transverse shoulder 27 is formed between the two strip segments of different widths. The strip supply means is designed so that between each stamping sequence the shoulder 27 rests against the offset 14 which thus is used as a fixed stop for the stepped longitudinal movement of the metal strip 3. In this way an accurate progression of the strip is assured, step by step, in the machinery.

Reduced width L2 of the strip is equal to the transverse dimension of the blanks to be cut, i.e., from tip to tip of the prongs 29b, 29c. Cutting punch 20 cuts away pieces such as 28 which are discharged through openings 7 of die 1. In this way a series of blanks 29 attached to each other by linking bridges or necks 30, are obtained.

In the example, the shape of the cutting punch 20, of die openings 6, and of counter-piece 19, is such that each cut blank consists of, on the one hand, a solid central head 29a having an outline almost in the form of a circle (in the example a hexagonal outline) and on the other hand, two elongated, lateral, pointed extensions 29b and 29c extending in opposite, radial directions and attached to the edge of solid head 29a. The two linking bridges 30 of each blank are attached to the solid head 29a of the blank and project in diametrically opposite directions with respect to one another. The lateral extensions 29b and 29c are located on both sides of the head between these bridges and project laterally with respect to the longitudinal direction of the strip.

At the first stamping station, each blank is stamped to make preliminary shape 31. This shape is the intermediary shape between that of the blank and the final form of the pronged member. The shaping of the solid head resting against the domed end of the finger 8 is done by movable punch 21. Almost all of the metal in the central area of the head is bent into a dome almost covering the entire area of the head. In addition, prong extensions 29a and 29b are partially folded back. In the example the finger 8 and punch 21 have spherically domed work-contact surfaces. The metal material of the solid head is arced in the opposite direction to that of the direction of extension of the prongs, in order to give the head the shape of a spherical cap intended to constitute the pronged member head.

At the second stamping station, preliminary shape 31 undergoes an additional stamping to give each pronged member its final shape. The edge of the head is bent at a 90° angle relative to the initial plane of the strip 3 by the hollow punch 24. The prongs arrange themselves in nearly parallel directions, approximately orthogonal to the plane of the strip.

In the outlet section, the linking bridges or necks 30 attaching each pronged member to its neighboring pronged members are cut by punch 26, to a depth which is a function of a previous adjustment of the postion of this punch. It is in this way that a continuous strip of pronged members may be made continuously, each pronged member being of one-piece, integral construction without separate parts in which two neighboring pronged members are attached by a bridge of predetermined weakness. However, punch 26 can be adjusted to sever completely the linking bridges or necks 30 and to detach the pronged members. In this case, the machinery can make separated pronged members of integral, one-piece construction at excellent economic conditions.

It will be understood that the described machinery constitutes only one of many variations of the concepts disclosed herein. To increase the rate of production, it is possible to arrange in parallel several working lines of the type described above on the same machinery. In addition, on each of the lines, each step of the process can be carried out in several successive work stations (n) in such a way that n pronged members are formed at each sequence. Therefore the progression rate of the strip is equal to the longitudinal direction of n pronged members.

Figure 8:
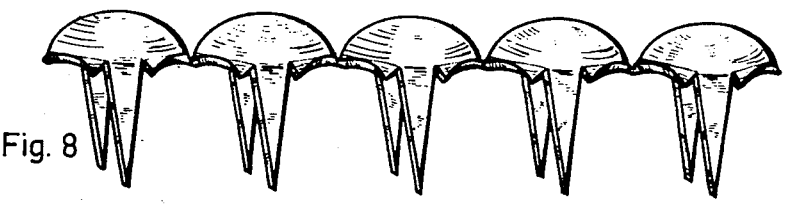
FIG. 8 is an enlarged, perspective view of a finished strip of pronged members made with the illustrated machinery.

FIG. 8 shows, by way of example, a strip of pronged members made according to the invention. The strip can be used directly in the automatic gun for which the pronged members and strip are designed, because the interval separating two bridges or necks (dimensions of each pronged member) is a constant value with very good accuracy. Depending on the gun type, the strip can be inserted in a rectilinear state or as a rolled package. The strip can also be installed by hammer in determined lengths, for example, to fix elements along a specific outline. Linking bridges between prong members are suitable for undergoing deformations, and this allows the strip to fit the shape of the desired outline.

These strips can be used in many applications: saddlery, the furniture industry, the shoe industry, etc. They can also be sold to the general public who can use them in lengths or who can separate the pronged members as they are needed.

Figure 9:
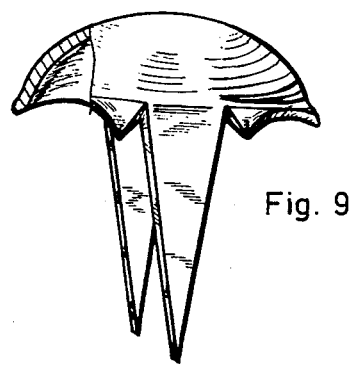
FIG. 9 is an enlarged, perspective view of a single, pronged member produced according to the invention, with a portion of its head sliced away.

FIG. 9 represents a two-pronged member with a partially notched head. The pronged members can be produced from various materials depending on how they will be used, e.g., steel, copper, brass, light alloy, oxidized metal, galvanized metal, bronzed metal, etc. The solid head and prongs can, of course, be made in various shapes and sizes, depending on utilization.

Figure 10:
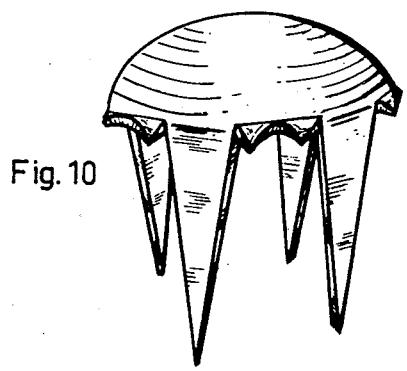

The prong member does not have to have two prongs. For example, it can have four, as seen in FIG. 10.

Figure 11:
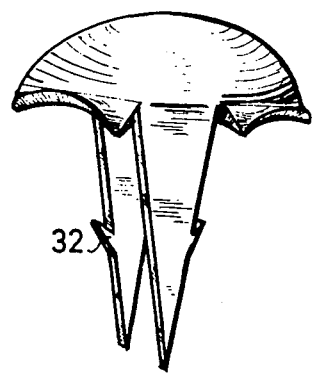
FIGS. 10 and 11 are enlarged, perspective views of two other forms of pronged members which may be produced by the machinery of the invention.

In addition, FIG. 11 represents another production method by which each prong has a spike 32 oriented laterally rearwardly with respect to each prong. With this type of arrangement, for certain applications, the risk of the prong being unseated is eliminated. The manufacturing process in the application is ideal for making such spiked prongs (or any other form of prong desired). All that has to be done is to adapt the cutting punch, die and counter-piece so that the prong-forming extensions of the blanks are cut correctly.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. Machinery for the mass production of rigid pronged members having a solid head and at least one pointed prong comprising first and second dies adapted to be assembled facing each other on a stamping press and to be brought sequentially into pressing contact with each other, the first die having a longitudinal groove and having, successively along the length of the groove, an inlet section for guiding a strip of metal, a cutting section composed of a stamp cutting die piece with an opening for scrap removal for cutting the strip into successive blanks composed of a head with at least one laterally projecting prong, a die stamping section composed of at least one die stamping finger protruding from a cavity provided in the first die toward the groove and finally an outlet section where the bottom of the groove has at least one slot for guiding the respective prongs; and said second die having opposite the above-mentioned cutting section, a counterpiece with movable cutting punch corresponding to the shape of said cutting die piece and, opposite the die stamping section, at least one movable punch positioned opposite each die stamping finger for shaping said head and at least one hollow punch surrounding said movable punch for bending the prong or prongs to a position out of the plane of the metal strip.

2. Machinery according to claim 1, wherein said die stamping section comprises two die stamping stations, the first station consisting of said die stamping finger in the first die and a coacting solid movable punch positioned in a hollow punch fixed to the second die; and the second station consisting of another of said die stamping fingers in the first die, and a coacting solid, retractable punch positioned in a hollow movable punch mounted in said second die.

3. Machinery according to claim 1, and useful for the manufacturing of pronged members connected together by integral, metal necks, wherein said cutting sections embody die cutting means to cut successive pronged blanks having heads successively connected by integral necks, and a second cutting die having cutting punch adjustably mounted in said second die, said cutting punch having two cutting edges aligned to cut into the necks to predetermined depth, which is dependent on the adjustable positioning of said cutting punch in said second die.

4. Machinery according to claim 1, wherein the inlet section of said groove in the first die has two parts of different widths, a downstream part of reduced size beginning with an offset forming a stop, and a wider part; and the second die having a cutting punch positioned to cut an edge of the metal strip along the line of said offset to a depth which narrows the width of the metal strip to that of the narrower part of the groove with the length of the cut being equal to the distance between respective pronged members.

5. Machinery according to claim 4, and resilent strip means on one side of the inlet section of the groove in the first die; said strip means being located on the same side of said groove as said offset in order to press the metal strip against the other side of the groove.

* * * * *